US006911596B2

(12) United States Patent
Ohtsubo et al.

(10) Patent No.: US 6,911,596 B2
(45) Date of Patent: Jun. 28, 2005

(54) METHOD FOR COVERING AN ARTICLE WITH A TUBULAR COVER MEMBER, TUBULAR COVER MEMBER AND COVERED ARTICLE

(75) Inventors: Masao Ohtsubo, Machida (JP); Hiroyuki Kobayashi, Kanagawa (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/478,065

(22) PCT Filed: May 14, 2002

(86) PCT No.: PCT/US02/15262

§ 371 (c)(1),
(2), (4) Date: Nov. 13, 2003

(87) PCT Pub. No.: WO02/092328

PCT Pub. Date: Nov. 21, 2002

(65) Prior Publication Data

US 2004/0168815 A1 Sep. 2, 2004

(30) Foreign Application Priority Data

May 15, 2001 (JP) ........................................ 2001-145291

(51) Int. Cl.⁷ ............................................... H01B 11/06
(52) U.S. Cl. ................... 174/36; 174/74 A; 174/DIG. 8
(58) Field of Search ................................ 174/36, 74 R, 174/74 A, 92, 93, 84 R, DIG. 8, 136

(56) References Cited

U.S. PATENT DOCUMENTS

| 3,515,798 A | * | 6/1970 | Sievert ........................ 174/135 |
| 3,709,751 A | | 1/1973 | Carlson et al. |
| 3,878,320 A | | 4/1975 | Mixon, Jr. et al. |
| 4,016,356 A | * | 4/1977 | McLoughlin .............. 174/35 R |
| 4,070,746 A | * | 1/1978 | Evans et al. ................... 29/450 |
| 4,289,553 A | * | 9/1981 | Nolf ............................. 156/86 |
| 4,389,440 A | | 6/1983 | Keith |
| 4,410,009 A | * | 10/1983 | Blum ........................ 138/109 |
| 4,506,430 A | * | 3/1985 | Guzay, Jr. .................... 29/450 |
| 5,098,752 A | | 3/1992 | Chang et al. |
| 5,589,667 A | | 12/1996 | Tsukazaki et al. |
| 5,753,861 A | * | 5/1998 | Hansen et al. ................ 174/93 |
| 5,856,634 A | * | 1/1999 | Borgstrom .................. 174/135 |
| 6,103,975 A | * | 8/2000 | Krabs et al. .............. 174/74 A |

FOREIGN PATENT DOCUMENTS

| EP | 0530952 A | * | 7/1992 | ........... B29C/61/06 |
| GB | 2099638 | | 12/1982 | |
| JP | 06-84745 | | 3/1994 | |
| JP | 07-18831 | | 1/1995 | |
| JP | 10 248137 | | 9/1998 | |
| WO | WO 94/22196 | * | 9/1994 | ........... B29C/61/06 |
| WO | WO 95/11542 | | 4/1995 | |
| WO | WO 96/07049 | | 3/1996 | |
| WO | WO 98/27632 | | 6/1998 | |
| WO | WO 98/40941 | | 9/1998 | |

* cited by examiner

Primary Examiner—William H. Mayo, III
(74) Attorney, Agent, or Firm—Yen Tong Florczak; Melanie G. Gover

(57) ABSTRACT

A tubular cover member (2) for covering an article (5) is folded longitudinally in a corrugated form and covers the periphery of a cylindrical support (1) in an expanded condition. The tubular cover member (2) has an unfolded length exceeding the length of the cylindrical support (1), and an unexpanded inner diameter approximately equal to or smaller than the outer diameter of the article (5). The tubular cover member (2) is composed of a room temperature recoverable material, such that the tubular cover member (2) shrinks to cover the article (5) when the support (1) is unwrapped and withdrawn from inside the tubular cover member (2).

10 Claims, 3 Drawing Sheets

METHOD FOR COVERING AN ARTICLE WITH A TUBULAR COVER MEMBER, TUBULAR COVER MEMBER AND COVERED ARTICLE

BACKGROUND OF THE INVENTION

1. Field of the Invention

The present invention relates to an article entirely covered with a tube, a tubular cover member for covering an article with a tube useful for producing such an article, and a method of covering an article with a tube. The present invention can be advantageously used for, for example, insulation and protection (waterproofing, oil-proofing, etc.) of a long article such as cables and cords, and rust prevention, corrosion prevention, or impact relaxation of tubes, cables, or wire harnesses of automobiles, electrical appliances or the like.

2. Description of the Related Art

Use of various room temperature shrink type tubes has heretofore been proposed for insulation treatment of wires and cables, rust prevention and impact relaxation treatments of metal pipes, or the like treatments. A room temperature shrink tube designates a tube that can be shrunk to have a desired shape at room temperature, namely, without heat treatment by mounting the tube on the periphery of a core such as a hollow cylinder in a pre-stretched state, and withdrawing the core. The tube is also termed a pre-stretched tube (PST).

For example, Japanese Unexamined Utility Model Publication (Kokai) No. 6-84754 discloses, as schematically shown in FIG. 1, a room temperature recoverable tube 50 characterized in that a radially expanded elastic tube 54 is mounted on a spacer 53 formed by detachably connecting two hollow cylinders each having a flange portion 51 at one end, approximately in the central portion. The room temperature recoverable tube is designed in such a manner that the hollow cylinders are separated by grasping both flange portions and pulling them after setting the room temperature shrink tube on wires, etc. The elastic tube shrinks from the central portion toward both ends, and can be mounted on wires, etc. when the spacer is removed from the elastic tube.

A similar room temperature shrink tube is disclosed as a self-recoverable tube in Japanese Unexamined Utility Model Publication (Kokai) No. 7-18831. The self-recoverable tube is characterized in that an elastic rubber or plastic tube is mounted on the cylindrical portion of a hollow cylindrical body provided with a flange portion at one end, an expansion portion at the other end, and a slit in the axial direction at the circumference while the tube is expanded to have a diameter larger than the maximum outer diameter of the expansion portion and suitably creased.

For the room temperature recoverable tube disclosed in Japanese Unexamined Utility Model Publication (Kokai) No. 6-84754, when the elastic tube is to be mounted on the hollow cylindrical body, the tube having a length approximately twice as large as the length of the cylindrical body can be mounted by forming creases in the tube in a bellows-like form. However, the method requires a cylindrical body that can be separated into two each having a flange portion at the end. The production of the cylindrical body therefore requires a complicated mold, and a cost increase in the production cannot be avoided. Moreover, since the structure of the cylindrical body is complicated, the method has the disadvantage that the cylindrical body having been used is difficult to withdraw from the tube after positioning inside the tube. In order to make the withdrawing operation easy, the interface between the cylindrical body and the tube is coated with a lubricant. However, since the lubricant remains on the inner surface of the tube after shrinking the tube, the method cannot be recommended in view of the adverse effects of contamination, by lubricant transfer to the wires, etc.

Moreover, for a self-recoverable tube disclosed in Japanese Unexamined Utility Model Publication (Kokai) No. 7-18831, provision of a slit in the axial direction at the circumference of the hollow cylindrical body makes the operation for withdrawing the cylindrical body easy after mounting the shrink tube. However, since the cylindrical body used herein also has a complicated structure, there still remains a room for improvement in the production cost and operation for withdrawing the cylindrical body.

Furthermore, there is a problem common to the above two types of room temperature recoverable tubes, namely, a problem about the flange portions to be attached to the end portions of the hollow cylindrical body. Since the flange portion is significantly large in comparison with the size of the cylindrical body, an ample space for mounting the flange portion on wires, etc. must be ensured in advance. That is, the sites to which the room temperature shrink tube can be applied are markedly restricted.

Incidentally, the applicant of this application has proposed, as disclosed in, for example, Japanese Examined Patent Publication (Kokoku) No. 49-46190, the use of a hollow cylindrical body having a continuous spiral groove formed on the wall surface over the entire length in order to make easy the operation of withdrawing the hollow cylindrical body used as a core. That is, since the core proposed herein is formed by separably and spirally bonding a strip-like piece, the core can be easily withdrawn by successively peeling the strip-like piece from the end portion, and the production cost can be reduced. However, when a long room temperature recoverable product using the core is to be provided, a long core having a length in accordance with that of the product must be prepared. As a result, the use of the product requires not only a wide storage space but also a wide operation space. Moreover, when the core is long, the operation of separating the strip-like piece and withdrawing it requires much time and labor.

An object of the present invention is to solve the problems associated with the prior art explained above, and provide a tube-covered article that is a long article entirely covered with a room temperature shrink type tube, that can be easily produced at low cost because the structure of the production tubular cover member is simple, and that requires no lubricant between the article and the tube.

Another object of the present invention is to provide a tubular cover member for covering an article with a tube that is useful for producing the tube-covered article of the invention, that has a simple structure, that can be stored and operated in narrow spaces, and that is excellent in operability.

Still another object of the present invention is to provide a method of covering an article with a tube that is useful for producing the tube-covered article of the invention and excellent in operability and that uses no lubricant.

The objects explained above and other objects will be easily understood from the detailed explanation made below.

SUMMARY OF THE INVENTION

In one aspect, the present invention provides a tube-covered article that comprises an article extending in the longitudinal direction and a cylindrical tubular cover covering at least loosely the article along a predetermined length thereof, the tubular cover member or "tube" being formed from a rubber material or a thermoplastic elastomer that covers the article as a result of room temperature recovery thereof, after withdrawing a support on which the tube is supported and carried to form a covering around the periphery of the cylindrical support, the tubular cover member having a length larger than that of the support, and an inner diameter approximately equal to or smaller than the outer diameter of the article, and the tubular cover member being mounted on the support while the tube is being expanded around the periphery of the support and collapsibly folded along the longitudinal direction thereof.

Furthermore, in another aspect thereof, the present invention resides in a tubular cover member for covering an article extending in the longitudinal direction with a cylindrical tube, in which the tubular cover member comprises a cylindrical support having inner diameter such that the article can be passed through the interior of both the support, and a tube, composed of a room temperature recoverable rubber material or thermoplastic elastomer, that is supported and carried by the support in the form of covering the periphery of the support, the tube having a length larger than that of the support and an inner diameter approximately equal to or smaller than the outer diameter of the article, the tube being mounted on the support in an expanded condition around the periphery of the support and collapsibly folded along the longitudinal direction thereof, and being capable of covering the article while shrinking to the length and inner diameter of the tube at the room temperature recovery of the tube, when the support is withdrawn therefrom.

Furthermore, in still another aspect thereof, the present invention resides in a method of covering an article extending in a longitudinal direction using a cylindrical tubular cover member, which method comprises the steps of:

mounting a tube composed of a room temperature recoverable rubber material or thermoplastic elastomer on a cylindrical support having such an inner diameter that the article can be passed through the interior of the tube, while the tube is being held in an expanded condition around the periphery of the support and collapsibly folded along the longitudinal direction thereof, the tube, recovered at room temperature, having a length larger than that of the support, and an inner diameter approximately equal to or smaller than the outer diameter of the article;

inserting the portion of the article to be covered with the tube into the cylindrical support on which the tube has been mounted, whereby the article is passed through the hollow portion of the support; and withdrawing the support from the tube, whereby the article is covered with the tube while the tube recovers to said length and inner diameter as a result of the room temperature recoverable characteristics of the tube.

In this application, the terms "tube" and "tubular cover member" are used interchangeably.

DESCRIPTION OF THE PREFERRED EMBODIMENTS

Figure 1:
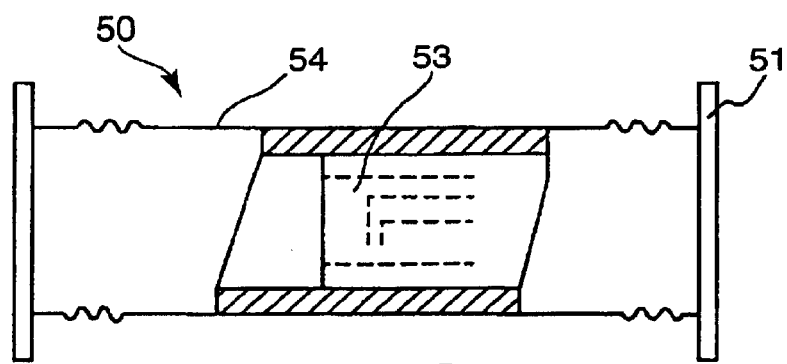
FIG. 1 is a cross-sectional view showing one embodiment of a conventional room temperature recoverable tube.

Tube-covered articles according to the present invention include various articles. Excellent effects of the invention can be fully obtained when the article is a longitudinal article and thus it extends in the longitudinal direction. Examples of suitable tube-covered articles in the practice of the present invention include electric wires, cables, cords, wires and pipes, though the articles are not restricted to those mentioned above. One example is cables having connectors that will be explained below in detail. Such cables are used in the interiors of personal computers, video games and pachinko-type slot game machines. Another example is automotive wiring harnesses.

The tube-covered article of the present invention is equipped with a cylindrical tubular member, or tube, that covers the article, at least loosely, along a predetermined length, preferably an approximately entire length of the article. Since the tube of the tube-covered article of the invention is sometimes mounted on the article closely, and sometimes mounted thereon loosely or movably, the terms "covers at least loosely" herein is intended to signify that various mounting forms of the tube in the tube-covered article of the invention are included. Accordingly, the inner diameter of the tube can be widely varied in accordance with a desired mounting form.

A cylindrical tubular cover member is typically supported and carried by a hollow cylindrical support, also referred to as a core, prior to mounting the tube on the article. In general, the tube is supported and carried by the cylindrical support as a covering around the periphery of the cylindrical support, and the article is covered with the tube as a result of room temperature recovery of the tube by withdrawing the support after inserting the article into the hollow portion of the support.

Although the cylindrical tube can be formed from various materials depending upon the applications, it is preferably formed from a rubbery material or a thermoplastic elastomer. In addition, since the tube is mounted on a core in an expanded condition, the tube preferably has excellent tear strength properties in order to prevent the tube from tearing during mounting on the core. In the practice of the present invention, the tear strength of the tube is preferably from 20 to 55 kN/m when represented by a crescent shape specified by the Japanese Industrial Standard JIS 6252.

Examples of suitable tube-forming rubber materials include, but are not limited to, silicone rubber, EPDM (ethylene-propylene-diene copolymer), IR, SBR, CR, IIR, NBR, hydrogenated NBR, acrylic rubber, ethylene acrylic rubber and fluoropolymers.

Examples of suitable tube-forming thermoplastic elastomers include, but are not limited to, olefin thermoplastic elastomers, and styrene thermoplastic elastomers such as SBS (styrene-butadiene block copolymers) and SEBS (styrene-ethylene butylene-styrene block copolymers).

The rubber material or thermoplastic elastomer described above can be formed into a cylindrical tube having a desired shape and dimension by any conventional tube-forming method. In one embodiment, the tube used in the present invention is ordinarily composed of a single layer film. However, in certain applications, the tube may have a multilayer structure of two or more layers.

In order to improve the properties of the tube thus obtained, when a tube is molded, various additives such as coloring agents, flame retardants, lubricants, processing aids, fillers, softening agents and antistatic agents may be added to the tube-forming materials in addition to conventional crosslinking agents and crosslinking aids in amounts such that the required recoverable properties and tear strength properties are not negatively effected.

Although the tube-covered article can be variously used, in many applications physical properties other than tear strength of the material are also important because many preferred applications require physical resistance to expected harsh environments. For example, when an electrical appliance or the like is arranged in a confined space, the tube-covered article may be exposed to high temperatures. The tube-forming material therefore preferably has a high heat resistance, most preferably, the tube-forming material preferably has a heat resistance from level B to F expressed by the heat resistance level specified by JIS K6380. Examples of suitable heat-resistant tube-forming materials include silicone rubber, EPDM, acrylic rubber and ethylene acrylic rubber.

Moreover, when the tube-covered article is to be attached to the periphery of an automobile engine, there is the possibility that potentially corrosive substances such as oil, gasoline or the like will fall thereon. Therefore, the tube-forming material preferably has high resistance to petroleum products, solvents and the like. In the practice of the present invention, the tube-forming material is usually preferred to have an oil resistance from level H to L expressed by the oil resistance level specified by JIS K6380. Examples of a suitable oil-resistant tube-forming material include silicone rubber, NBR, hydrogenated NBR, acrylic rubber, ethylene acrylic rubber and fluororubbers.

Moreover, for the tube-covered article, when observation of the article surrounded by the tube is desirable, the tube-forming material preferably has good transparency. Examples of a suitable transparent tube-forming material include silicone rubber. In addition, such a tube may be a semi-transparent or colored transparent tube, if necessary.

The size of the cylindrical tube can be widely varied in accordance with its applications. The tube is usually preferred to have a thickness from 0.1 to 3.0 mm as required when the tube is collapsibly folded in the longitudinal direction. When the tube has a thickness less than 0.1 mm, it becomes more likely that the tube will tear during mounting the tube on the core. On the other hand, when the tube has a thickness greater than 3.0 mm, it becomes more difficult to collapsibly fold the tube in the longitudinal direction.

The cylindrical tube advantageously has a length significantly greater than that of the core that supports and carries the tube. That is, since the present invention adopts a system wherein the tube is mechanically expanded and mounted on the core, a longer tube can be mounted on the core because the tube is minutely and collapsibly folded on the core in the longitudinal direction to form a corrugated shape. Although the tube length can be widely varied in accordance with its applications, the length is usually from about 20 to 100 cm or more depending on the handling required. The cylindrical tube may also have a length outside the range mentioned above depending on the applications.

When the tube is to be collapsibly folded and mounted on the core, the length of the mounted tube is usually preferred to be from ½ to ⅕ of the length of the tube that is expanded in the radial direction before collapsibly folding it. As long as the length of the mounted tube is larger than ½ of the unfolded tube length, covering an article with the tube substantially produces no problems. On the other hand, when the length thereof is less than ⅕ of the length of the unfolded tube, corrugated tube creases are excessively formed, and the tube cannot be mounted on the core.

The inner diameter of the cylindrical tube is preferably approximately equal to or smaller than the outer diameter of the article to be covered with the tube. However, the tube may have an inner diameter larger than the outer diameter of the article, depending on the applications of the tube-covered article thus obtained.

Still another aspect of the present invention resides in a tubular cover member for covering the article as explained above. The tubular cover member comprises, as explained above, a cylindrical support (core) having an inner diameter via which the article as mentioned above can be passed through the interior of the core, and a cylindrical tube composed of a room temperature recoverable rubber material or thermoplastic elastomer supported and carried by the core in the form of a cover around its periphery.

As explained above, the cylindrical tube preferably has a length larger than that of the core and an inner diameter approximately equal to or smaller than the outer diameter of the article, and is mounted on the core while being expanded around the periphery of the core and collapsibly folded along the longitudinal direction thereof. When the core is withdrawn from the tubular cover member for the purpose of providing the tube-covered article, the tube is capable of covering the article while recovering to the length and inner diameter of the tube corresponding to the characteristics of the material used.

The cylindrical support used as a core in the tubular cover member of the present invention can be formed from various materials with an optional shape and an optional size convenient for handling. The suitable support-forming material is a plastic material due to its easy formability, and preferably has a suitable flexibility when used as a core. Examples of suitable support-forming materials include polypropylene, cellulose acetate butyrate, polyethylene and polyvinyl chloride though they are not restricted to those materials mentioned above.

A suitable cylindrical support is prepared by integrally forming a plastic ribbon in a spiral shape to give a cylindrical body. The cylindrical support body may also be formed by another method in which the external surface of a hollow cylinder is spirally cut. The cylindrical support has sufficient strength to hold the expanded tube in an expanded state. Therefore, in the cylindrical support formed by any core forming method, placing ribbon portion adjacent to another ribbon portion in the ribbon width direction, each ribbon portion is bonded or connected to the nearest ribbon portion in a temporary bonded state. Such a cylindrical support can be unwrapped by successively unfastening one ribbon portion from another along spirally formed grooves or cuts, etc. by manually withdrawing one end of the plastic ribbon. An alternative core may be blow molded.

In order to make easy the operation of withdrawing the cylindrical support from the tubular cover member for covering an article with a tube, it is preferred to process in advance at least one end face of the cylindrical support long enough to be pulled manually to provide a withdrawing tab.

It is preferred from the operational point of view that the withdrawing tab be passed through the interior of the cylindrical support and projected from the other end surface of the support. It is therefore preferred that the withdrawing tab usually be longer than the whole support length by about 50 to 100 mm. When the withdrawing tab is longer by less than 50 mm, manually withdrawing the tab becomes difficult. On the other hand, a withdrawing more than 100 mm is too long to be economical.

The size of the cylindrical support can be suitably selected by taking into consideration the size of an article that must be passed through the interior thereof, and the size of the cylindrical tube that is to be mounted around the periphery of the support while being expanded in the radial direction. For example, the length of the cylindrical support is usually from about 10 to 30 cm or more. Although he inner diameter of the cylindrical support is preferably as small as possible, there must be a hollow portion through which an article can be easily passed, and an ample gap for unfastening the ribbon must be ensured within the support. Therefore, the inner diameter of the cylindrical support is usually from about 1 to 10 cm.

In addition, Japanese Examined Patent Publication (Kokoku) No. 49-46190 should be referred to for the details of a cylindrical support composed of a spirally wrapped plastic ribbon.

Other suitable cylindrical supports include one, as disclosed in, for example, Japanese Unexamined Patent Publication (Kokai) No. 5-326045, having a hairpin-like return portion for changing the direction of a core ribbon break (separation) into the reverse direction (making an angle of 180° with the initial direction) so that the core ribbon can be linearly withdrawn, and one, as disclosed in Japanese Unexamined Patent Publication (Kokai) No. 7-123561, produced by forming a rectangular sheet material into a cylindrical shape and detachably connecting the end portions that face each other.

In still another aspect thereof, the present invention resides in a method of covering an article with a tube that can be advantageously used for producing the tube-covered article. The method of covering an article with a tube comprises the following steps.

(1) A specific cylindrical tube according to the present invention explained above is mounted on a specific cylindrical support (core) according to the invention by expanding the tube around the periphery of the core and collapsibly folding the tube along the longitudinal direction thereof.

(2) The region of the article to be covered with the tube is inserted into the core on which the tube has been mounted, so that the region is passed through the hollow portion thereof.

(3) The core that supports and carries the tube is withdrawn from the tube, whereby the periphery of the article is covered with the tube.

As understood from the explanation made above, in the practice of the present invention, a cylindrical body formed from a plastic ribbon in a spiral form is used as a core, and the core is preferably withdrawn from the tube while the core is being disassembled by unwrapping and withdrawing one end of the plastic ribbon from the core.

EXAMPLES

The present invention will subsequently be explained by making reference to its examples. Note, however, that the present invention is in no way restricted thereto.

Figure 4:
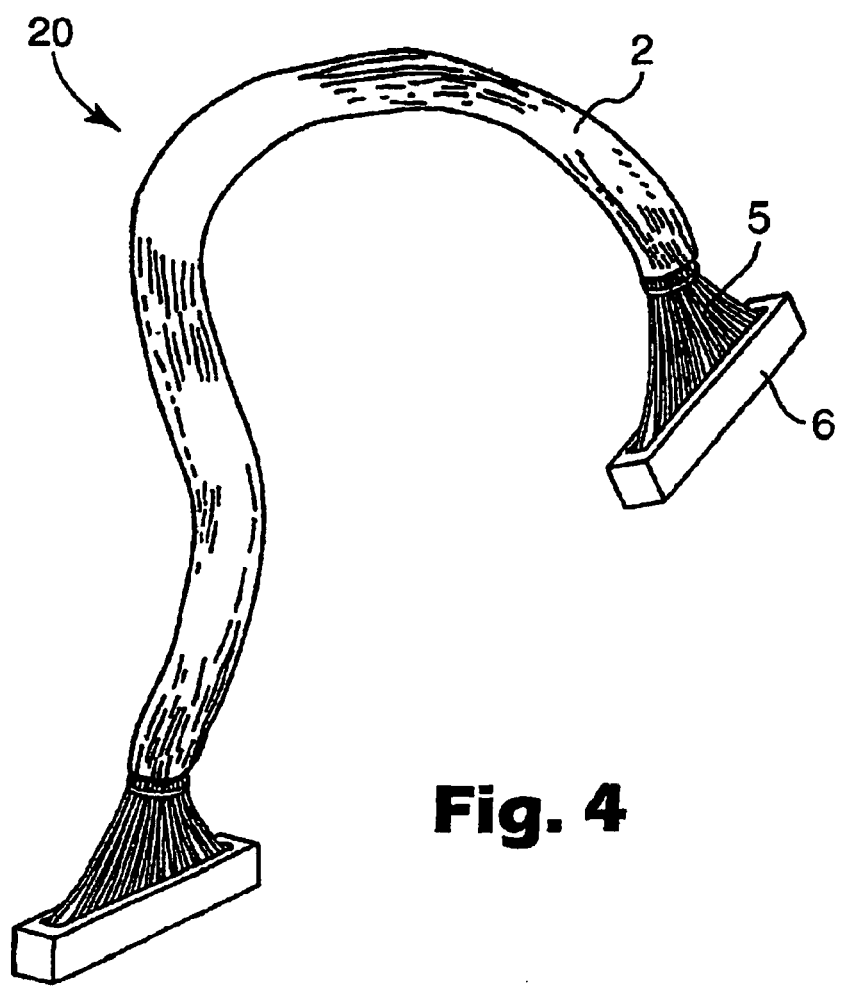
FIG. 4 is a perspective view showing a preferred embodiment of a tube-covered article according to the present invention.
Figure 5A:
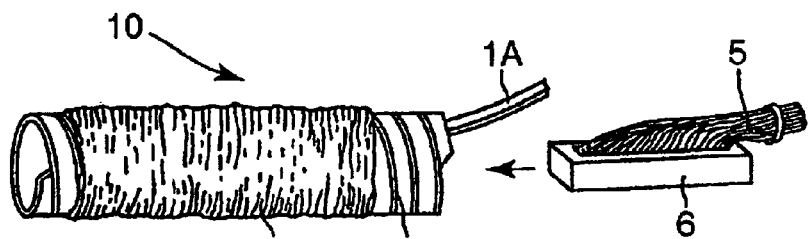
FIG. 5 shows cross-sectional views successively exhibiting the production method of the tube-covered article of FIG. 4.
Figure 5B:
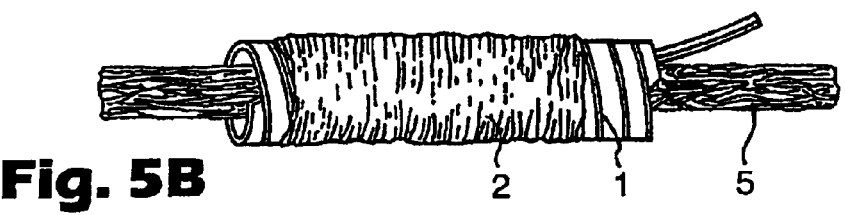
Figure 5C:
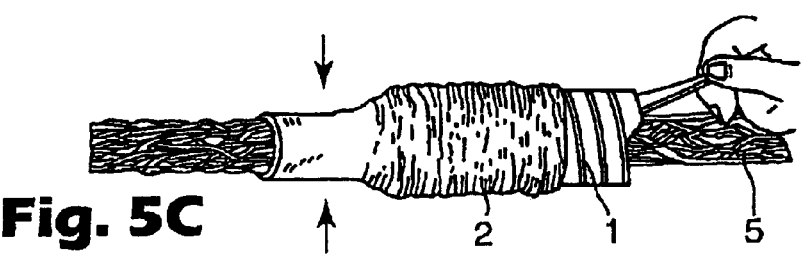
Figure 5D:
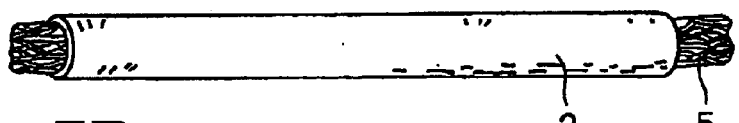

In the present example, flat cables having connectors and used in the interior of a pachinko type slot game machine (so-called "pachi-slo") are covered with a transparent, room temperature recoverable tube to give a harness product 20 as shown in FIG. 4. For the harness product 20, the bundle portion of a number of cables 5 having connectors 6 at both respective ends is covered with a transparent, room temperature shrink tube. There is a slight gap between the tube 2 and cables 5. Since the harness product 20 is protected by the tube 2, the product is not only prevented from prohibited modifications made by detaching the cables but also easily monitored visually by regulating personnel because the tube 2 is transparent. In addition, the conventional procedure requires removal of the connectors before the cables are carefully covered with the tube, following which the connectors are attached again.

Figure 2:
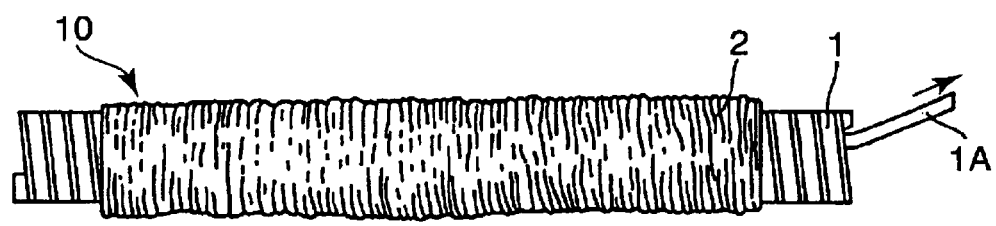
FIG. 2 is a perspective view showing a preferred embodiment of a tubular cover member for covering an article with a tube according to the present invention.

A tubular cover member for covering an article with a tube 10 as shown in FIG. 2 was prepared. A cylindrical support 1 to be used as a core was made of polypropylene, and was a body formed from a spirally formed ribbon. The core had an inner diameter of 43 mm, an outer diameter of 46 mm and a length of 130 mm. The ribbon had a width of 9 mm. One end of the core was used as a ribbon withdrawing tab 1A, that was separated in the form of a ribbon, passed through the interior of the core, to extend slightly from the other end thereof. An arrow in the figure indicates the withdrawing direction of the withdrawing tab 1A.

Figure 3:
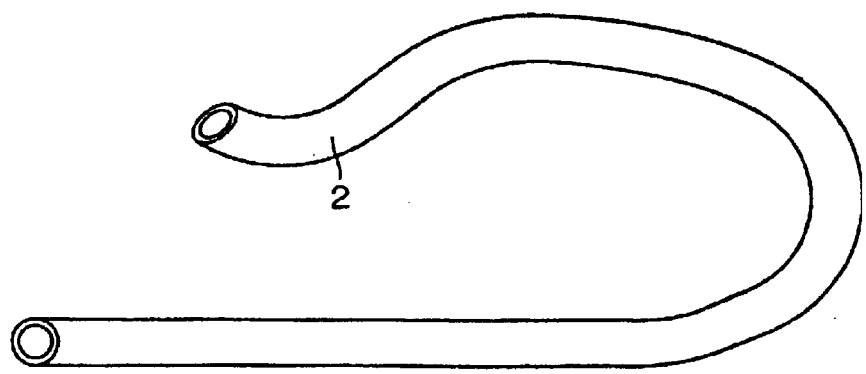
FIG. 3 is a perspective view showing a room temperature recoverable tube used in the tubular cover member for covering an article with a tube in FIG. 2.

The room temperature recoverable tube used in the present example was a long transparent tube 2 shown in FIG. 3 as a perspective view. The tube was made of a silicone rubber, and had an inner diameter of 16 mm, an outer diameter of 17.6 mm, a length of 500 mm and a thickness of 0.8 mm. Moreover, the silicone rubber tube showed the following physical properties: a hardness of 70; an elongation of 670%; a tensile strength of 9.43 Mpa; and a tear strength of 50.07 kN/m.

The transparent tube 2 in FIG. 3 was expanded in the radial direction using an expanding machine (not shown), and mounted around the periphery of the cylindrical support 1 shown in FIG. 2. Since the expanded tube 2 was applied over the periphery of the support 1 having a length shorter than that of the tube 2 as shown in FIG. 2, the tube 2 was minutely and collapsibly folded in the longitudinal direction. The length of the tube 2 was shortened from 500 mm to 110 mm because the tube was folded in a corrugated form.

Using the tubular cover member 10 for covering an article with a tube in FIG. 2, an operation for covering cables with the tube was conducted by successive procedures illustrated in FIG. 5.

In the step (A), cables 5 were inserted into the hollow portion of a cylindrical support 1 of the tubular cover member 10 from the portion of a connector 6 at first. During the insertion of the connector 6, cables 5 were stacked on the connector 6 in the longitudinal direction to make the cross-section as small as possible. An arrow in the figure shows the insertion direction of the connector 6. Successive insertion of the connector 6 and cables 5 into the hollow portion of the support 1 produced a state shown in the step (B) in which cables 5 support and carry the tubular cover member for covering the cables with the tube 10.

The step (C) was subsequently conducted. When the withdrawing tab 1A of the cylindrical support 1 was manually withdrawn, the support 1 holding the tube 2 disappeared, and as the tube 2 recovered, at room temperature, it covered the cables 5 as shown by arrows in the figure. Finally, as shown in the step (D), the cables 5 were entirely covered with the tube 2, that is, the harness product 20 shown in FIG. 4 was obtained.

For comparison, the procedure explained above was repeated except that the same transparent tube was mounted on the cylindrical support (core) without collapsibly folding the tube and without further processing. A core having a length of 390 mm was necessary, and the operation for mounting the tube was difficult.

It is understood from the above facts that the production of the harness product with a transparent tube by applying the present invention can shorten the length of the cylindrical support used as the core to up to ⅓ of the length in the conventional method. Moreover, since the length of the ribbon to be withdrawn is reduced to ⅓, the present invention provides a significantly improved process.

As explained above, according to the present invention, the length of the tube on the core can be greatly shortened in comparison with the conventional method wherein the room temperature recoverable tube is mounted without modification on the cylindrical support (core), thereby producing tube-covered article. Moreover, as a result of shortening the length of the tube, the length of the core itself can be shortened. Accordingly, the tube can be mounted with excellent operability even in a narrow space, and reduction of a space for storing the tubular cover member for covering an article with a tube and a saving in resources can also be realized. Moreover, since use of flanges in combination for withdrawing the core is unnecessary in contrast to the conventional methods, ensuring a wide operation space in accordance with the flanges becomes unnecessary. Furthermore, since the withdrawing amount of the ribbon forming the core is decreased, the method can be improved, and the amount of industrial waste can be decreased.

Furthermore, when the room temperature recoverable tube is formed from a material having heat resistance, oil resistance, solvent resistance and the like, a tube-covered article that can be advantageously used for electronic apparatus, and electrical appliances, and around the periphery of automobile engines can be provided.

Still furthermore, when the room temperature recoverable tube is formed from a transparent material, the status an article covered with the tube can be visually confirmed. For example, flat cables with connectors (harness) used for connection in the interior of a so-called "pachi-slo" machine are periodically inspected for the purpose of preventing prohibited modification. However, an article covered with the transparent tube of the invention can be easily inspected. Moreover, although two large connectors are attached to both ends of the cables, respectively, the tube can be mounted in the present invention without detaching the connectors in contrast to the conventional harness, and therefore the operability is excellent.

What is claimed is:

1. A tubular cover member for covering an article extending in a longitudinal direction, the cover member comprising:
   a cylindrical support formed from a spirally formed ribbon having an inner diameter having a sufficient size for the article to pass through the interior of the cylindrical support; and
   a tube composed of a room temperature recoverable rubber material or thermoplastic elastomer, the tube having an unfolded length exceeding the length of the cylindrical support and an unexpanded inner diameter equal to or smaller than the outer diameter of the article, wherein at least a portion of the tube being supported and carried on the cylindrical support is folded longitudinally in a corrugated form such that the folded portion of the tube covers the periphery of the cylindrical support in an expanded condition to receive the article in the interior of the cylindrical support for covering the article by shrinking the tube when the support is unwrapped and withdrawn from inside the tube.

2. The tubular cover member of claim 1, wherein the tube has a thickness of 0.1 mm to 3.0mm and a tear strength of from 20 kN/m to 55 kN/m, determined as specified by JIS6252.

3. The tubular cover member of claim 1 wherein the longitudinally folded tube covering the cylindrical support has a length of from one fifth to one half of the length of the unfolded tube at room temperature.

4. The tubular cover member of claim 1, wherein the cylindrical support of the spirally formed ribbon has a free end wherein the cylindrical support can be successively unwrapped from inside the tube by withdrawing the free end of the ribbon.

5. The tubular cover member of claim 1 wherein the tube is formed from a silicone rubber.

6. A tube-covered article comprising:
   an article extending in a longitudinal direction; and
   a cylindrical tubular cover member covering the article along a predetermined length thereof, characterized in that:
   the cylindrical tubular cover member is formed from a room temperature recoverable material selected from a rubber or a thermoplastic elastomer that covers the article as a result of room temperature recovery of the cylindrical tubular cover member from an expanded condition wherein a length of the cylindrical tubular cover member is folded longitudinally in a corrugated form and supported and carried on a cylindrical support formed from a spirally formed ribbon to cover the periphery of the cylindrical Support with the cylindrical tubular cover member that recovers as the support is unwrapped and withdrawn from inside the cylindrical tubular member that has an unfolded length exceeding the length of the support and an unexpanded inner diameter approximately equal to or smaller than the outer diameter of the article.

7. A method for forming a tube-covered article, comprising the steps of:
   a) providing the article;
   b) providing a tubular cover member comprising:
      a cylindrical support formed from a spirally formed ribbon having an inner diameter of a sufficient size for the article to pass though the interior of the cylindrical support; and
      a tube composed of a room temperature recoverable rubber material or thermoplastic elastomer, the tube having an unfolded length exceeding the length of the cylindrical support and an unexpanded inner diameter approximately equal to or smaller than the outer diameter of the article, at least a portion of the tube being supported and carried on the cylindrical support folded longitudinally in a corrugated form, such that the folded portion of the tube covers the cylindrical support in an expanded condition;
   c) inserting at least a portion of the article into the interior of the cylindrical support; and
   d) unwrapping and withdrawing the support form the tube whereby the tube whereby the tube recovers to recover its unfolded length and unexpanded inner diameter so as to cover the article extending in a longitudinal direction.

8. A device for covering an article, comprising:

a support member formed from a spirally formed ribbon, the support member having a size sufficient for an article to pass through an interior of the support member; and a tube composed of a room temperature recoverable material, the tube folded longitudinally in a corrugated form and supported on the periphery of the support member in a radially expanded condition, wherein the tube has a folded length shorter than a length of the support member, and an unfolded length longer than a length of the support member.

9. The device of claim 8, wherein the folded length of the tube is from one-fifth to one-half of the unfolded length of the of the tube.

10. The device of claim 8, wherein the entire tube is supported on the periphery of the support member.

* * * * *

UNITED STATES PATENT AND TRADEMARK OFFICE
CERTIFICATE OF CORRECTION

PATENT NO. : 6,911,596 B2
DATED : June 28, 2005
INVENTOR(S) : Ohtsubo, Masao

It is certified that error appears in the above-identified patent and that said Letters Patent is hereby corrected as shown below:

Column 7,
Line 16, delete "he" and insert -- the --.

Column 10,
Line 66, delete "form the tube whereby the tube whereby" and insert -- from the tube whereby --.

Column 12,
Line 6, delete "of the of the tube." and insert -- of the tube. --.

Signed and Sealed this

Fourth Day of April, 2006

JON W. DUDAS
*Director of the United States Patent and Trademark Office*